United States Patent [19]

Yale

[11] 3,928,332
[45] Dec. 23, 1975

[54] PROCESS FOR THE PRODUCTION OF 4-[3-[10-(2-TRIFLUOROMETHYL) PHENOTHIAZINYL]-PROPYL]-1-PIPERAZINEETHANOL, 1-ADMANTANE CARBOXYLIC ACID ESTER

[75] Inventor: Harry Louis Yale, New Brunswick, N.J.

[73] Assignee: E. R. Squibb & Sons, Inc., Princeton, N.J.

[22] Filed: Apr. 22, 1974

[21] Appl. No.: 462,821

[52] U.S. Cl. ............................ 260/243 A; 424/247
[51] Int. Cl.² ........................................ C07D 279/28
[58] Field of Search ............................... 260/243 A

[56] References Cited
UNITED STATES PATENTS 3,320,248   5/1967   Bernstein..................... 260/243 A
3,320,249   5/1967   Bernstein..................... 260/243 A Primary Examiner—John D. Randolph
Attorney, Agent, or Firm—Lawrence S. Levinson; Merle J. Smith

[57] ABSTRACT

An improved process for the production of 4-[3-[10-(2-trifluoromethyl)phenothiazinyl]propyl]-1-piperazineethanol, 1-adamantane carboxylic acid ester, a long acting ataractic agent, which yields the compound directly as the free base in crystalline form, comprises reacting 4-[3-[10-(2-trifluoromethyl)phenothiazinyl]propyl]-1-piperazineethanol with a 1-adamantoyl halide in the presence of an organic amine acid acceptor in an anhydrous aromatic hydrocarbon solvent in which the reactants are soluble but in which the organic amine hydrochloride by-product is insoluble.

9 Claims, No Drawings

PROCESS FOR THE PRODUCTION OF 4-[3-[10-(2-TRIFLUOROMETHYL) PHENOTHIAZINYL]- PROPYL]- 1-PIPERAZINEETHANOL, 1-ADMAANTANE CARBOXYLIC ACID ESTER

SUMMARY OF THE INVENTION

This invention relates to an improved process for the production of 4-[3-[10-(2-trifluoromethyl)phenothiazinyl]propyl]-1-piperazineethanol, 1-adamantanecarboxylic acid ester, directly as the base in crystalline form. This process comprises esterifying 4-[3-[10-(2-trifluoromethyl)phenothiazinyl]propyl]-1-piperazineethanol with a 1-adamantoyl halide, preferably the chloride or bromide, at an elevated temperature, in the presence of an organic amine acid acceptor in an anhydrous aromatic hydrocarbon solvent in which the two reactants and organic tertiary amine acid acceptor are soluble but in which the amine halide by-product is insoluble. The organic tertiary amine acid acceptor includes, for example, lower alkylamines, aniline derivatives or alkylated nitrogen heterocyclics. The aromatic hydrocarbon solvents include benzene or lower alkyl benzenes.

BACKGROUND OF THE INVENTION

4-[3-[10-(2-trifluoromethyl)phenothiazinyl]propyl]-1-piperazineethanol, 1-adamantanecarboxylic acid ester is a long acting ataractic agent derived from fluphenazine and described in U.S. Pat. No. 3,320,248, issued May 16, 1967. According to that patent, 4-[3-[10-(2-trifluoromethyl)-phenothiazinyl]propyl]-1-piperazineethanol is made to react with 1-adamantoyl chloride in dry chloroform. The chloroform solution is then treated with ethereal hydrogen chloride to obtain as the crystalline product the hydrochloride salt (Example 2A). In order to form the free base, the hydrochloride is neutralized with aqueous potassium carbonate solution in ether and the product, as the base, is obtained from the ether solution as a viscous oil.

Since the long acting effects of the compound are best obtained by parenteral administration, preferred compositions are solutions in a parenterally acceptable liquid vehicle, e.g., in a vegetable oil like peanut oil, cottonseed oil, sesame oil or the like or a synthetic vehicle such as ethyl oleate or other fatty acid ester. The 4-[3-[10-(2-trifluoromethyl)phenothiazinyl]propyl]-1-piperazineethanol, 1-adamantanecarboxylic acid ester, hydrochloride, obtained by the method of the cited patent, though crystalline, is not soluble in the oily vehicle and must be formulated as a suspension which is less desirable. The product, in the form of the base, is obtained by the method of the patent, by first isolating the hydrochloride salt and then neutralizing it to obtain the base. By this method, the base is obtained as a viscous oil.

It is clearly preferable to obtain the desired oil soluble base in pure crystalline form and without having to go through the hydrochloride salt. The method of this invention produces the desired product as the base in crystalline form directly without the need for the additional steps of forming and isolating the crystalline hydrochloride salt and converting it back to the base.

DETAILED DESCRIPTION OF THE INVENTION

According to this invention, 4-[3-[10-(2-trifluoromethyl)phenothiazinyl]propyl]-1-piperazineethanol is reacted with about an equivalent amount, e.g., about 1:0.9 to 1.3, preferably 1:0.95 to 1.1 equivalents of a 1-adamantoyl halide, preferably the chloride or bromide and especially the chloride. The reaction with fluphenazine is carried out at an elevated temperature in the presence of an organic tertiary amine acid acceptor in an anhydrous aromatic hydrocarbon solvent in which the two reactants and the organic amine acid acceptor are soluble but in which the organic amine halide formed as a byproduct from the acid acceptor is insoluble.

The temperature at which the reaction is effected can be within the range of about 60° to 150°C, preferably about 80° to 135°C. According to the preferred modification, the acid acceptor is added slowly to a solution of the two reactants and heat is applied after completing the addition. The reaction is carried out under anhydrous conditions. About 2 to 10 hours is sufficient for the reaction to be completed.

The easily formed 1-adamantanecarboxylic acid chloride is preferred as reactant.

The organic amine acid acceptor can be selected from lower alkylamines such as triethylamine, which is preferred, trimethylamine, ethyl diisopropylamine, etc., other tertiary amines such as aniline derivatives, e.g. N-lower alkylanilines like N,N-dimethylaniline, or alkylated nitrogen heterocyclics like N-ethylmorpholine, N-methylpiperidine, bis 1,4-dimethylpiperazine, N-(n-propyl) pyrrolidine or the like.

The solvent which functions as the reaction medium is an aromatic hydrocarbon including benzene, toluene, xylene, which constitute preferred members, as well as other lower alkylbenzenes like cumene, p-cymene, mesitylene, diethylbenzene, durene, o-cymene or the like.

It is essential that the aromatic solvent is one in which the 4-[3-[10-(2-trifluoromethyl)phenothiazinyl]-propyl]-1-piperazineethanol and the 1-adamantoyl halide reactants, as well as the acid acceptor are soluble and one in which the amine halide salt formed during the reaction, e.g., triethylamine hydrochloride, is insoluble. The separation of this salt from the reaction mixture tends to drive the reaction to completion. Thus a non-aromatic organic solvent such as tetrahydrofuran, in which an amine halide like triethylamine hydrochloride is soluble, is unsuitable for obtaining the desired product as the base. The use of chloroform, as described in the patent, is not desirable since the three dimensional structure of the adamantane ring permits the entry of proton donor solvents like chloroform to produce solvates which are extremely stable; such solvated molecules are generally unacceptable as pharmaceutical agents.

The aromatic solvents described above are excellent solvents for the two reactants and the acid acceptor, but very poor solvents for the amine salt which is formed as by product. Under these conditions, a quantitative yield of the amine salt is obtained and it is easily filtered from the reaction mixture. The filtrate is then concentrated to give the crystalline base in high yield. The crystalline base gives a non-hygroscopic dihydrochloride upon treatment with hydrochloric acid, which is useful for analytical purposes.

3

The following examples are illustrative of the invention. All temperatures are in degrees Celsius.

EXAMPLE 1

A solution of 9.1 g. of 4-[3-[10-(2-trifluoromethyl)-phenothiazinyl]propyl]-1-piperazineethanol and 5.0 g. of 1-adamantoyl chloride in 200 ml. of anhydrous benzene is treated dropwise and with stirring, with 2.1 g. of triethylamine dissolved in 10 ml. of anhydrous benzene. A precipitate forms during the addition. Subsequently, the mixture is heated and stirred under reflux for six hours. During this time, the original curdy white precipitate changes into a dense, white powder. The mixture is cooled and filtered to give 2.9 g. of triethylamine hydrochloride, m.p. 256°–257° (dec.). The benzene filtrate is concentrated in vacuo on a rotary evaporator. The residue weighs about 14.0 g. and, when cooled, crystallizes spontaneously to give the product, m.p. 96°–98°. Recrystallization from 222 ml. of hexane gives 11.0 g of 4-[3-[10-(2-trifluoromethyl)phenothiazinyl]propyl]-1-piperazineethanol, 1-adamantanecarboxylic acid ester, m.p. 96°–98°.

Anal. Calc'd. for $C_{33}H_{40}F_3N_3O_2S$: C, 66.10; H, 6.72; N, 7.00 Found: C, 66.32; H, 6.90; N, 7.01.

EXAMPLE 2

To a solution of 21.9 g. of 4-[3-[10-(2-trifluoromethyl)phenothiazinyl]propyl]-1-piperazineethanol and 12.1 g. of 1-adamantoyl chloride in 425 ml. of anhydrous toluene is added 5.1 g. of triethylamine in 25 ml. of anhydrous toluene. The flocculent precipitate that forms during the addition changes to a dense white powder in the subsequent 4-hour reflux period. The product is worked up as in Example 1 to obtain 26.5 g. of 4-[3-[10-(2-trifluoromethyl)phenothiazinyl]propyl]-1-piperazineethanol, 1-adamantanecarboxylic acid ester, m.p. 96°–98°.

EXAMPLE 3

A solution of 7.3 g. of 4-[3-[10-(2-trifluoromethyl)-phenothiazinyl]propyl]-1-piperazineethanol and 4.0 g of 1-adamantoyl chloride in 160 ml. of anhydrous xylene is treated dropwise with stirring with 1.7 g. of triethylamine. The mixture is stirred and then heated under reflux for 2 hours. The product is then worked up as in Example 1 to give 8.8 g of 4-[3-[10-(2-trifluoromethyl)phenothiazinyl]propyl]-1-piperazineethanol, 1-adamantanecarboxylic acid ester, m.p. 96°–98°.

What is claimed is:

1. A process for the production of crystalline 4-[3-[10-(2-trifluoromethyl)phenothiazinyl]propyl]-1-piperazineethanol, 1-adamantane carboxylic acid ester, which comprises reacting 4-[3-[10-(2-trifluoromethyl)phenothiazinyl]propyl]-1-piperazineethanol with about 1:0.9 to 1.3 equivalents of a 1-adamantoyl halide at a temperature within the range of about 60° to 150°C. for about 2 to 10 hours in the presence of an organic tertiary amine acid acceptor in an anhydrous aromatic hydrocarbon solvent in which the two reactants and acid acceptor are soluble but in which the amine halide by product is insoluble and separating 4-[3-[10-(2-trifluoromethyl)phenothiazinyl]propyl]-1-piperazineethanol, 1-adamantane carboxylic acid ester from the reaction medium.

2. A process as in claim 1 wherein the acid acceptor is a lower alkylamine and the solvent is benzene, toluene or xylene.

3. A process as in claim 1 wherein the acid acceptor is triethylamine and the solvent is benzene.

4. A process as in claim 1 wherein the acid acceptor is triethylamine and the solvent is toluene.

5. A process as in claim 1 wherein the acid acceptor is triethylamine and the solvent is xylene.

6. A process for the production of crystalline 4-[3-[10-(2-trifluoromethyl)phenothiazinyl]propyl]-1-piperazineethanol, 1-adamantane carboxylic acid ester, which comprises esterifying 4-[3-[10-(2-trifluoromethyl)phenothiazinyl]propyl]-1-piperazineethanol with about 1:0.95 to 1.1 equivalents of 1-adamantoyl chloride in anhydrous benzene, toluene or xylene in the presence of triethylamine at a temperature within the range of about 80° to 135° C for about 2 to 10 hours, filtering off the triethylamine hydrochloride formed during the reaction and separating crystalline 4-[3-[10-(2-trifluoromethyl)phenothiazinyl]propyl]-1-piperazineethanol-1-adamantane carboxylic acid ester from the solvent.

7. A process as in claim 6 wherein the solvent is benzene.

8. A process as in claim 6 wherein the solvent is toluene.

9. A process as in claim 6 wherein the solvent is xylene.

* * * * *